(12) United States Patent
Dreano

(10) Patent No.: US 6,761,108 B1
(45) Date of Patent: Jul. 13, 2004

(54) PRESSING MOLD FOR HOLDING AND PRESSING FOODSTUFF, SUCH AS HAM PIECES, WHILE THEY ARE BEING COOKED, AND A METHOD OF COOKING THE FOODSTUFF

(75) Inventor: Claude Dreano, Mauron (FR)

(73) Assignee: Armor Inox S.A., Mauron (FR)

( * ) Notice: Subject to any disclaimer, the term of this patent is extended or adjusted under 35 U.S.C. 154(b) by 413 days.

(21) Appl. No.: 09/668,312

(22) Filed: Sep. 25, 2000

(30) Foreign Application Priority Data

Sep. 24, 1999 (FR) ............................................. 99 12112

(51) Int. Cl.[7] .............................. A23L 1/00; A22C 7/00; B30B 7/02; A47J 27/08; A23P 1/00
(52) U.S. Cl. .............................. 99/349; 99/351; 99/353
(58) Field of Search .......................... 99/330, 349–351, 99/352–355, 369, 371, 379, 432, 423; 100/194, 265, 266, 268, 910, 295, 344, 325, 219; 425/338; 249/82, 117, 121, 167; 452/174, 185; 426/506, 407, 418, 519, 512, 513, 523, 106, 108, 119, 120

(56) References Cited

U.S. PATENT DOCUMENTS

| | | | | |
|---|---|---|---|---|
| 1,680,816 A | * | 8/1928 | Spaulding ..................... | 99/349 |
| 1,863,609 A | * | 6/1932 | Vanderkloot ................. | 99/351 |
| 1,928,877 A | * | 10/1933 | Britt et al. ................. | 99/351 X |
| 2,157,303 A | * | 5/1939 | Penrose et al. .............. | 99/349 |
| 2,161,089 A | * | 6/1939 | Reinwald .................... | 99/349 |
| 2,310,956 A | * | 2/1943 | Hoy ........................... | 99/351 |
| 3,580,165 A | * | 5/1971 | Foldenauer .................. | 99/351 |
| 3,604,339 A | | 9/1971 | Beck et al. | |
| 3,796,144 A | * | 3/1974 | Foldenauer et al. .......... | 99/355 |
| 4,756,505 A | * | 7/1988 | Vegas ......................... | 249/82 |
| 4,891,237 A | * | 1/1990 | Rabotski .................... | 99/441 X |
| 4,957,271 A | * | 9/1990 | Summers et al. .......... | 99/351 X |

FOREIGN PATENT DOCUMENTS

| | | |
|---|---|---|
| DE | 42 19 862 C | 7/1993 |
| EP | 0 625 325 A | 11/1994 |
| FR | 2 505 297 A | 11/1982 |
| FR | 2 508 279 A | 12/1982 |
| FR | 2 525 437 A | 10/1983 |
| FR | 2 688 385 A | 9/1993 |
| FR | 2 763 572 A | 11/1998 |

* cited by examiner

Primary Examiner—Timothy F. Simone
(74) Attorney, Agent, or Firm—Lowe Hauptman Gilman & Berner, LLP

(57) ABSTRACT

A pressing mold for receiving a foodstuff, such as ham pieces, as it is being cooked and pressed in a hermetically sealed wrap, comprises a cover to press the foodstuff being cooked and to allow the foodstuff to expel an exudate. The mold comprises at least one transverse partition bounding, inside the mold, a main pouch of the wrap. The main pouch carries the foodstuff. The wrap includes at least one lateral pouch connected to the main pouch by a bridge including passages through which the exudate flows during cooking. The lateral pouch fits into a space in the mold between the partition and an end wall of the mold. A space is provided between the upper edge of each partition and a cover of the mold. The space is such as to prevent pinching of the passages during cooking and pressing of the foodstuff.

8 Claims, 4 Drawing Sheets

PRESSING MOLD FOR HOLDING AND PRESSING FOODSTUFF, SUCH AS HAM PIECES, WHILE THEY ARE BEING COOKED, AND A METHOD OF COOKING THE FOODSTUFF

FIELD OF INVENTION

The present invention relates generally to pressing molds for holding and pressing foodstuff, such as ham pieces, while it is being cooked and more particularly to a mold in combination with a hermetically sealed wrap containing such a foodstuff wherein the wrap includes main and lateral secondary pouches with a passage arrangement between them for enabling exudate expelled from the foodstuff during cooking to flow from the main to the secondary pouches, and to a method using such molds and wraps. The invention also relates to a stackable set of pressing molds including a plurality of such molds mounted on a frame fitted with a footing.

BACKGROUND ART

According to one prior art technique, foodstuff, such as ham pieces, is placed inside a mold and the foodstuff temperature is raised to about 68° C. over a time of approximately 10 h. During this time, the ham pieces expel an exudate including brine used in a pickling operation, water, gases and other liquids. During such cooking, each mold is covered by a lid that applies pressure to the cooked object to enhance exudate expulsion. The exudate can be evacuated directly from the mold, in which case the exudate soils the molds and sanitary problems are incurred.

To circumvent the problems associated with such direct evacuation, ham pieces have previously been wrapped before cooking in hermetically sealed wraps which are loose enough that only a portion of the wrap covers the ham pieces and the other portion of the wrap is folded. The expelled exudate remains stagnant in the wrap until cooking is completed when it is evacuated from the wrap by piercing the wrap. This solution is not wholly satisfactory because it imparts to the ham an appearance which is unsettling to the consumer.

In another solution, a main pouch holding the ham is fitted with a secondary pouch shaped in such a way that the exudate drains by gravity and then is collected. This step is followed by welding the secondary pouch so it is insulated from the main pouch. The secondary pouch is then cut from the main pouch. This arrangement does not enable the cooked and pressed food product to be easily sliced in a market.

SUMMARY OF THE INVENTION

An object of the present invention is to provide a new and improved pressing mold for holding a wrap containing a product to be cooked and offering a solution comprising one main pouch and at least one secondary pouch.

In accordance with one aspect of the invention, a pressing mold is provided for receiving and pressing a foodstuff, such as ham pieces, as it is being cooked. The foodstuff is hermetically sealed in a main pouch of a wrap including at least one secondary pouch laterally displaced from the main pouch. The wrap includes a segment between the main and secondary pouches including a passage arrangement between the main and secondary pouches for enabling exudate expelled from the foodstuff during cooking and pressing to flow laterally from the main pouch to the secondary pouch during the cooking and pressing. The mold comprises a cover for pressing the foodstuff in the main pouch during cooking and for enabling the foodstuff to expel the exudate. At least one transverse wall inside the mold forms a boundary for a main volume that received the main pouch. The mold includes at least one secondary volume for receiving the lateral pouch. The at least one transverse wall has an upper edge arranged so a space is subtended between the upper edge and the cover in a manner to prevent pinching of the passage arrangement in the wrapper segment between the main pouch and the at least one lateral pouch situated above the corresponding partition.

Such a mold preferably assumes the shape of an elongated chute. A given number of chutes also may be affixed to a frame resting on a footing.

Advantageously, the length of the cover is less than the distance between two transverse partitions or between one partition and an end wall.

In another feature of the invention, the partition(s) is (are) fitted with lateral recesses to provide a passage between the partition and the side wall of the mold to allow folds of the wrap to be received in the mold.

Advantageously, the length of the upper edge of the partition(s) between a pair of notches is larger than the total width of a flange of the wrap.

In another feature of the invention, the partition(s) is (are) designed in such a way that, within the main volume, at the intersection of a side wall of the mold and the partition, reserve volumes are formed to house the folds of the wraps. To form the reserve volumes, the partition(s) is (are) advantageously fitted with two lateral bends pointing toward the bottom of the mold to form two lateral bent parts sloping toward the mold end. The slope of the lateral bent parts is advantageously between 15° and 30°.

The present invention also relates to a stackable set of a plurality of the aforementioned molds mounted on a frame fitted with a footing.

Another aspect of the invention relates to a method of cooking and pressuring a foodstuff, such as ham pieces, that exudes an exudate during cooking and pressing, wherein the foodstuff is located in a main pouch of a hermetically sealed wrap including a lateral secondary pouch displaced to the side of the main pouch and connected to the main pouch by a segment of the wrap. The segment includes a passage arrangement between the main and lateral pouches. The method comprises placing the wrap with the foodstuff hermetically sealed therein in a mold having a partition between first and second compartments into which the main and lateral pouches are respectively placed. Then a cover is placed on the mold so that the passage arrangement between the main and lateral pouches remains open. Then the foodstuff is cooked while (a) the mold pressurizes the foodstuff via the wrap, (b) maintaining the foodstuff in a hermetically sealed state in the wrap, (c) keeping the passage arrangement open, and (d) forcing the exudate laterally from the main pouch to the lateral pouch via the open passage arrangement. The passage arrangement is kept open by providing a large enough space between a top edge of the partition and a bottom face of the cover.

Preferably, substantial flow of the exudate in the lateral pouch to the main pouch is prevented after cooking and pressing by sealing the passage arrangement after cooking and pressing. Then the segment is cut to separate the lateral pouch with the exudate therein from the main pouch.

The above and still further objects, features and advantages of the present invention will become apparent upon consideration of the following detailed descriptions of one specific embodiment thereof, especially when taken in conjunction with the accompanying drawings.

DETAILED DESCRIPTION OF THE DRAWING

Figure 1:
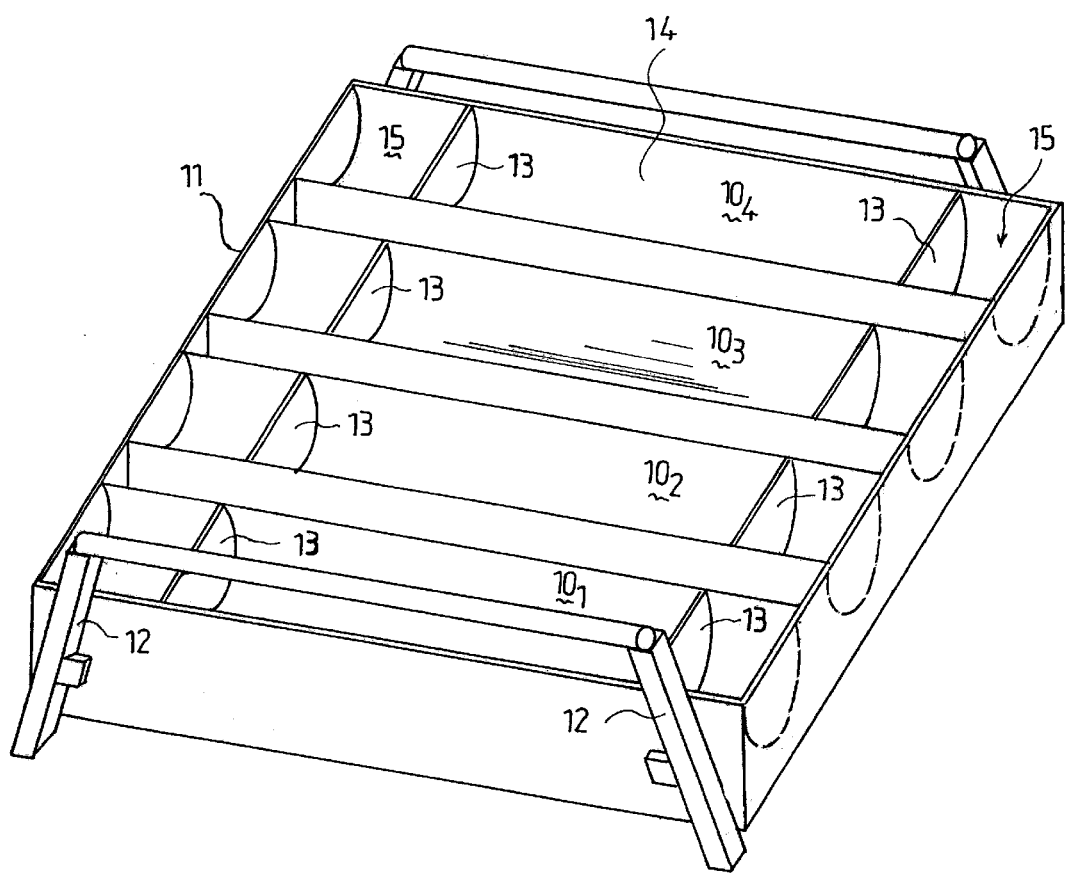
FIG. 1 is a perspective view of a stackable set of pressing molds according to a preferred embodiment of the present invention.

The stackable set of molds illustrated in FIG. 1 comprises four molds $10_1$ through $10_4$ including adjoining longitudinally extending chutes having a U-shaped cross-section with a rounded bottom. The ends of molds $10_1$ through $10_4$ are rigidly joined to a substantially rectangular frame 11. The upper edge of the frame 11 is in substantially the same plane as the upper edges of the side and end walls of molds $10_1$ through $10_4$.

Adjacent the opposite ends of each end wall of frame 11 are welded two footings 12, each including two identical feet that support molds $10_1$ through $10_4$. The set of molds shown in FIG. 1 is designed to be stacked onto other identical sets of molds so that the footings 12 of abutting mold sets nest.

Even though the present description relates to a set of pressing molds mounted on a frame, it is understood that the present invention relates both to such a set and to a single pressing mold.

As described infra, each pressing mold $10_1$ through $10_4$ comprises a cover (not shown in from FIG. 1) making it possible to apply a pressure to a food product received in each mold. In one preferred embodiment, a cover is mounted by means of elastic elements such as springs (not shown) underneath each of molds $10_1$ through $10_4$. When two sets of molds are stacked one on the other, the covers underneath the molds $10_1$ through $10_4$ of the upper set of molds cover the molds of the lower set and as a result the products contained in the molds of the lower set are compressed.

Each of molds $10_1$ through $10_4$ is fitted near its end wall with a transverse partition, i.e., wall, 13. Each of partitions 13 in each of molds $10_1$ through $10_4$ forms a boundary for a main mold volume 14 and a secondary mold volume 15.

Figure 2:
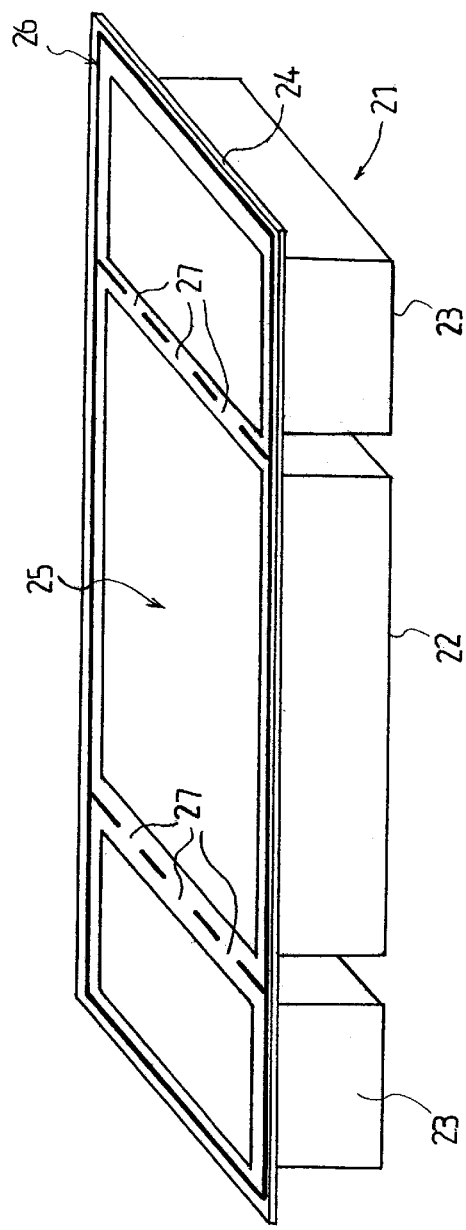
FIG. 2 is a perspective view of a wrap hermetically sealing ham pieces and which is used with the pressing mold of FIG. 1.

Moreover, each of molds $10_1$ through $10_4$ can include only a single transverse partition 13 which forms a boundary between main mold volume 14 and secondary mold volume 15. Primary and secondary mold volumes 14 and 15 are bounded to receive wrap 20, illustrated in FIG. 2.

Wrap 20 comprises a lower part 21 including main pouch 22, that encloses the ham pieces J, and two lateral pouches 23, respectively situated at opposite ends of main pouch 22. The upper end of lower part 21 includes a substantially planar flange 24 extending completely around main and side pouches 22 and 23. Wrap 20 is sealed by a sealing foil 25 resting on and bonded to the entire area of flange 24 by welding bead 26 between the lower wrap part 21 and the sealing foil 25. The lower part 21 of wrap 20 is preformed by thermoforming and is lidded by foil 25 after ham pieces J to be cooked have been placed into main pouch 22. Interruptions 27 in the portions of bead 26 in the portion of wrap 20 that forms a bridge between main pouch 22 and lateral pouches 23 provide fluid flow paths between the main pouch and the lateral pouches so that exudate from ham pieces J flows from ham pieces J in main pouch 22 to lateral pouches 23 during cooking and pressing of ham pieces J.

Figure 3:
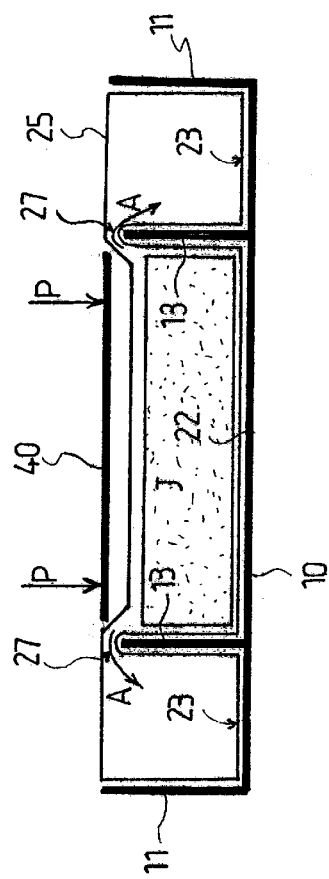
FIG. 3 is a longitudinal section view in a median plane of the pressing mold of FIG. 1.

FIG. 3 is a longitudinal section view of a median plane of one of molds 10 fitted with the end walls of frame 11 and transverse walls 13. The main pouch 22 containing the ham pieces is received in main volume 14 of mold 10 between the transverse walls 13, whereas each of the lateral pouches 23 is received in the secondary volume 15 between each of transverse walls 13 and the adjacent end wall 11.

If the mold is fitted only with a single partition 13, the wrap 20 to be received in such a mold would include a single lateral pouch 23. The main pouch 22 containing ham pieces J would be received between the mold end wall and transverse partition 13.

The upper face of each mold 10, i.e., the portion of each mold opposite from the rounded bottom of each mold, is covered by cover 40 fitted with a spring arrangement (not shown), preferably of a type disclosed in U.S. Pat. No. 5,921,171, for applying pressure P to ham pieces J contained in main pouch 22. As ham pieces J are being cooked, the pressure P that cover 40 applies to the ham pieces in main pouch 22 expels the exudate through the passages 27 formed by the breaks in the welding bead 26 between foil 25 and flange 24. The exudate then flows (arrows A) into side pouches 23. Pressing ham pieces J in the molds 10 enhances recovering the exudate in lateral pouches 23. The exudate is recovered by (1) welding passages 27 after cooking of the ham pieces and (2) then cutting the lateral pouches 23 from main pouch 22 prior to the ham pieces in the main pouch being offered for sale.

For clarity, FIG. 3 shows in exaggerated form the spaces between partitions 13 and the wall of main pouch 22 and between ham pieces J and the main pouch wall. This description also applies to the space between cover 40 and foil 25, as well as between foil 25 and ham pieces J.

Transverse partitions 13 serve as end walls for the ham pieces received in main pouch 22 and the ham pieces bear against the partitions through the wall of main pouch 22. If mold 10 includes only a single partition 13, ham pieces J rest against the single partition 13 and against an end wall of mold 10. Cover 40 also presses against ham pieces J via the upper portion of wrap 20 with which the cover makes contact. Transverse partitions 13 are configured in such a way that they fall within the space between main pouch 22 and the lateral pouches 23 when wrap 20 is situated in mold 10.

In the mold of FIG. 3, the length of cover 40 is slightly less than the distance between the two partitions 13 of each mold (or a partition 13 and an end wall in the case of a mold including only a single partition). Accordingly, by exerting pressure on the ham pieces J inside main pouch 22, cover 40 descends below the level of the upper edge 13a of each partition 13.

In another embodiment (not shown), the cover 40 covers the entire length of mold 10 between the mold opposite end walls carrying footings 12. In this case, a relatively large play must be provided between the upper edge of transverse partition 13 and the lower face of pressing cover 40 in its pressing position to prevent pinching, i.e., blocking, of passages 27 in the bridge between main pouch 22 and lateral pouch 23 so the exudate can flow into pouches 23 from main pouch 22.

Figure 4:
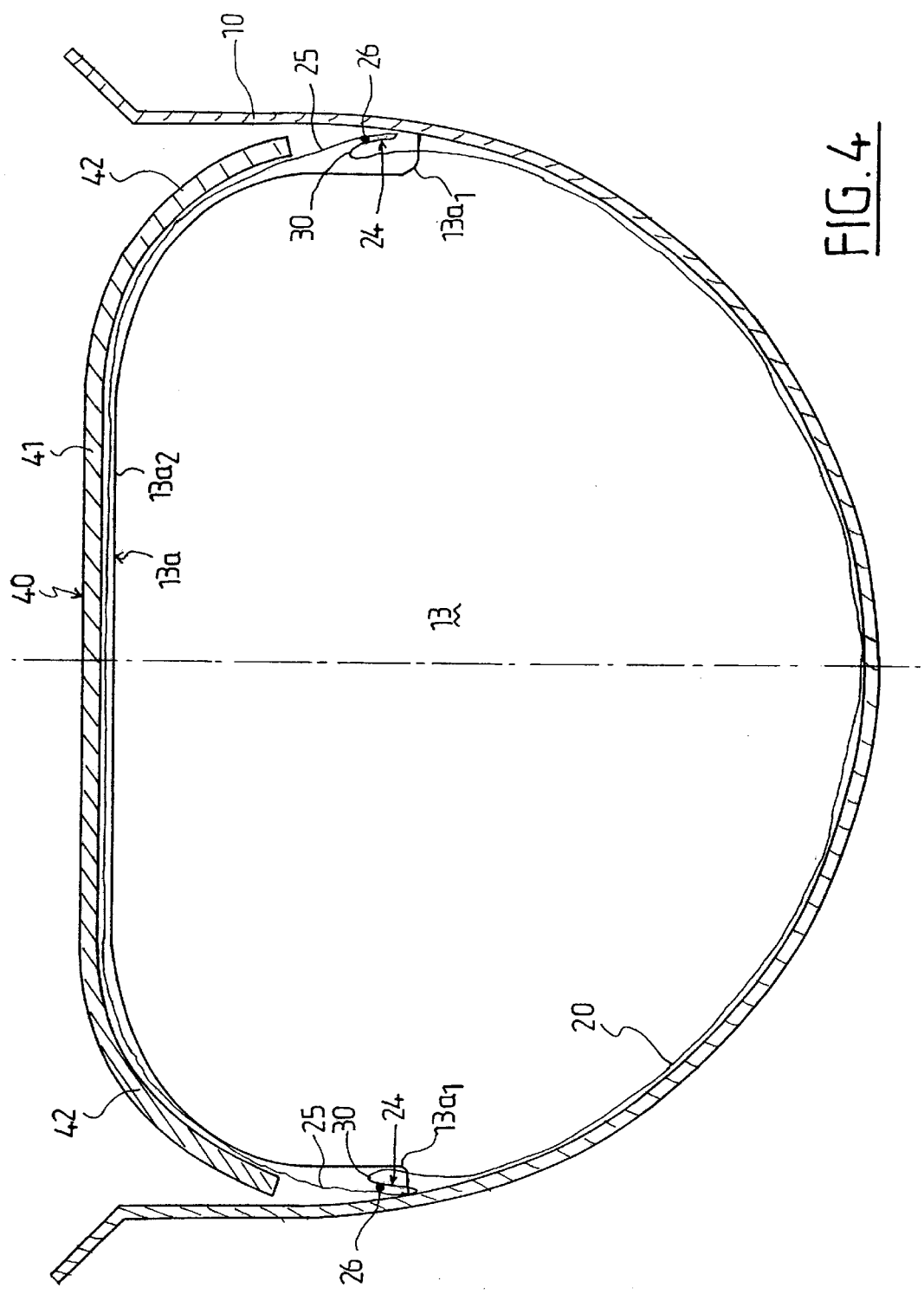
FIG. 4 is a top view of a transverse partition of the pressing mold of FIG. 1.

FIG. 4 is a cross-sectional view of mold 10, with a detailed view of a semi-circular contour extending between two short opposite vertical wall segments, each terminating in an outward bend. As illustrated in FIG. 4, cover 40 includes a substantially planar middle portion 41 and two opposite lateral parts 42 shaped as arcs of a circle. Mold 10 and cover 40 are used to cook ham pieces in wrap 20 so the ham has a round shape in cross-section.

The pressing action of mold 10 and cover 40 cause the ham pieces in wrap 20 to assume the shape of the mold and cover. To assist in providing the pressing action, wrap 20 includes side flaps 30 that touch the side wall of the mold when the wrap is put into the mold. To form flap 30, wrap 20 must be folded near flange 24. When wrap 20 is put into mold 10, flange 24 is bent against the inside surface of the side wall of mold 10. As illustrated in FIG. 4, foil welding bead 26 connects flange 24 to foil 25 on the upper portion of wrap 20.

To enable flaps 30 to pass freely between main pouch 22 and side pouches 23, particularly in the vicinity of transverse partitions 13, each of partitions 13 includes a pair of opposite upper edges 13a, each comprising a recess $13a_1$, that is spaced from the side wall of mold 10. Recesses $13a_1$, enable flaps 30 to freely pass near transverse partitions 13, so flaps 30 do not buckle at the ends of main pouch 22. As a result, the foodstuff in main pouch 22, once cooked, has clear-cut and regular ends. In case the foodstuff is congealed ham pieces, these clear-cut and regular ends restrict the initial cutting thickness and consequently improve the slicing efficiency of the congealed ham pieces.

To assure that the exudate circulates freely when flowing from main pouch 22 to side pouch 23 and to prevent pinching passages 27 by cover 40, each upper edge 13a of each partition 13 includes a horizontal upper part $13a_2$ situated a given distance from the cover 40 when the cover is in position to compress the ham pieces J in main pouch 22. The length of upper edge 13a of each partition 13 between opposite recesses $13a_1$ is larger than the total width of the flange 24 of wrap 20.

Figure 5:
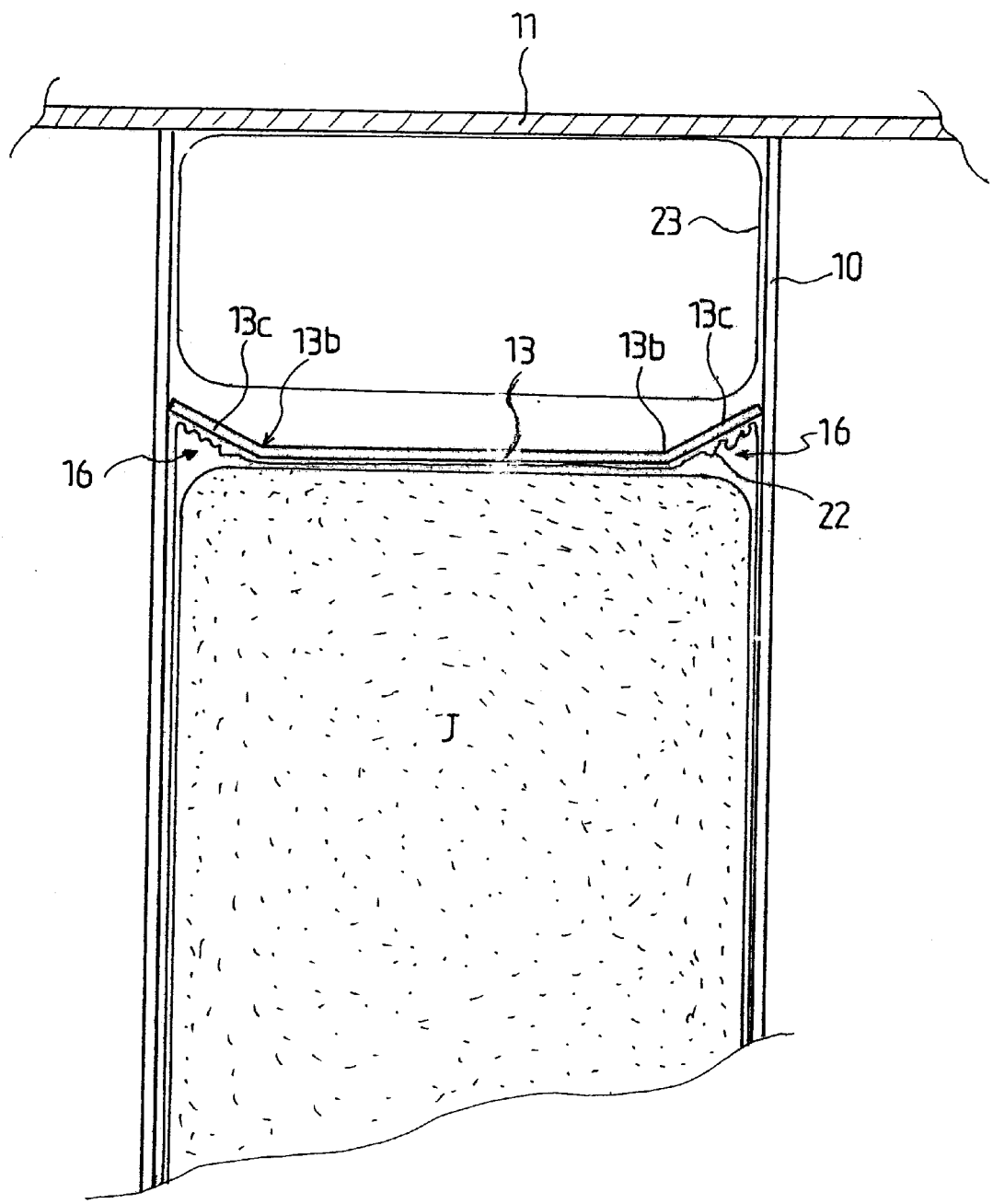
FIG. 5 is a top view of the pressing mold of FIG. 1 in combination with the wrap shown in FIG. 2.

FIG. 5 is a top view of details of transverse partition 13 of mold 10. As illustrated in FIG. 5, partition 13 comprises two lateral bends 13b pointing toward the bottom U-shaped portion of the mold to form two opposite lateral bent parts 13c sloping toward the end of the mold 10. Advantageously, the slope has an angle of 15° and 30° relative to a straight portion of partition 13 between bends 13b. These lateral parts 13c form reserve volumes 16 in each of molds 10. Reserve volumes 16 receive folds of main pouch 22. On one-hand, volumes 16 folds hugging the semi-cylindrical side wall of mold 10 and on the other hand the volumes result from the lateral parts 13c following the rounded shape of cover 40. Consequently, an initial cut in the ham through the wrap is not adversely affected by the folds of main pocket 22 that receive the ham pieces.

While there has been described and illustrated one specific embodiment of the invention, it will be clear that variations in the details of the embodiment specifically illustrated and described may be made without departing from the true spirit and scope of the invention as defined in the appended claims.

I claim:

1. A pressing mold for receiving and pressing a foodstuff, such as ham pieces, as it is being cooked, the foodstuff being hermetically sealed in a main pouch of a wrap including at least one secondary pouch laterally displaced from the main pouch, the wrap including a segment between the main and secondary pouches including a passage arrangement between the main and secondary pouches for enabling exudate expelled from the foodstuff during cooking and pressing to flow laterally from the main pouch to the secondary pouch during the cooking and pressing, said mold comprising a cover for pressing said foodstuff in the main pouch during cooking and for enabling the foodstuff to expel the exudate, at least one transverse wall inside the mold bounding a main volume for receiving the main pouch, at least one secondary volume for receiving the lateral pouch, the at least one transverse wall having an upper edge arranged so a space is subtended between the upper edge and said cover in a manner to prevent pinching of the passage arrangement in the wrapper segment between the main pouch and the at least one lateral pouch situated above the corresponding partition.

2. The mold of claim 1 wherein the length of the cover is less than the distance separating two transverse walls of the mold.

3. The mold of claim 1 wherein each transverse wall includes lateral recesses for enabling lateral flaps of the wrap to be received in the mold between the transverse wall and a portion of a side wall of the mold adjacent the transverse wall.

4. The mold of claim 3 wherein the length of the upper edge of each transverse wall between a pair of recesses in each partition is larger than the total width of a flange of the wrap.

5. The mold of claim 1 wherein each of the transverse walls is configured in such manner as to provide reserve volumes for receiving folds of the wrap, the reserve volumes being located in a main volume of each mold at an intersection of a side wall and a transverse wall of the mold.

6. The mold of claim 5 wherein each transverse wall includes two lateral bends pointing toward a bottom portion of the mold to form two lateral bent elements sloping toward the,end of the mold, the reserve volume being formed by the lateral bent elements.

7. The mold of claim 6 wherein each of said bent elements subtends an angle between 15° and 30° relative to a straight portion to the transverse wall between the bent elements.

8. A stackable set of molds comprising a plurality of molds mounted on a frame fitted with a footing, wherein each mold is configured as defined in claim 1.

* * * * *